US012528527B2

(12) United States Patent
Mo et al.

(10) Patent No.: US 12,528,527 B2
(45) Date of Patent: Jan. 20, 2026

(54) TRAIN CONTROL METHOD BASED ON MOBILE AUTHORIZATION VERIFICATION

(71) Applicant: CASCO SIGNAL LTD., Shanghai (CN)

(72) Inventors: Zhisong Mo, Shanghai (CN); Tao Wang, Shanghai (CN); Jiqing Na, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 521 days.

(21) Appl. No.: 18/013,262

(22) PCT Filed: Sep. 23, 2021

(86) PCT No.: PCT/CN2021/119766
§ 371 (c)(1),
(2) Date: Dec. 28, 2022

(87) PCT Pub. No.: WO2022/222373
PCT Pub. Date: Oct. 27, 2022

(65) Prior Publication Data
US 2023/0257012 A1   Aug. 17, 2023

(30) Foreign Application Priority Data

Apr. 20, 2021 (CN) .......................... 202110426722.3

(51) Int. Cl.
*B61L 27/40* (2022.01)
*B61L 15/00* (2006.01)
(Continued)

(52) U.S. Cl.
CPC ........... *B61L 27/40* (2022.01); *B61L 15/0018* (2013.01); *B61L 15/0072* (2013.01); *B61L 23/00* (2013.01); *B61L 25/025* (2013.01); *B61L 27/00* (2013.01); *B61L 27/20* (2022.01); *B61L 27/70* (2022.01); *B61L 2027/202* (2022.01); *B61L 2027/204* (2022.01); *B61L 2201/00* (2013.01); *B61L 2205/00* (2013.01)

(58) Field of Classification Search
CPC .. B61L 27/40; B61L 15/0018; B61L 15/0072; B61L 23/00; B61L 25/025; B61L 27/00; B61L 27/20; B61L 27/70; B61L 2027/202; B61L 2027/204; B61L 2201/00; B61L 2205/00; B61L 99/002
See application file for complete search history.

(56) References Cited

FOREIGN PATENT DOCUMENTS

| CN | 112550357 A | * | 3/2021 | ............. B61L 27/70 |
| CN | 112572537 A | * | 3/2021 | ............. B61L 11/08 |
| EP | 3654675 A1 | * | 5/2020 | ............ H04W 24/02 |

OTHER PUBLICATIONS

CN 112572537 machine translation (Year: 2021).*

* cited by examiner

Primary Examiner — Zachary L Kuhfuss
(74) Attorney, Agent, or Firm — JCIPRNET

(57) ABSTRACT

The invention relates to a train control method based on mobile authorization verification, which compares driving permission sent by a vehicle-mounted device to a ground trackside device with driving permission calculated by itself, and outputs the strictest driving permission. Compared with the prior art, the invention has the advantages that the correctness of mobile authorization calculation is improved, and the safety of train stop points is ensured.

5 Claims, 4 Drawing Sheets

(51) Int. Cl.
*B61L 23/00* (2006.01)
*B61L 25/02* (2006.01)
*B61L 27/00* (2022.01)
*B61L 27/20* (2022.01)
*B61L 27/70* (2022.01)

TRAIN CONTROL METHOD BASED ON MOBILE AUTHORIZATION VERIFICATION

CROSS-REFERENCE TO RELATED APPLICATION

This application is a 371 of international application of PCT application serial no. PCT/CN2021/119766, filed on Sep. 23, 2021, which claims priority to Chinese Patent Application Ser. No. 202110426722.3, entitled "TRAIN CONTROL METHOD BASED ON MOBILE AUTHORIZATION VERIFICATION", filed on Apr. 20, 2021. The entirety of each of the above mentioned patent applications is hereby incorporated by reference herein and made a part of this specification.

1. TECHNICAL FIELD

The invention relates to train signal control systems, in particular to a train control method based on mobile authorization verification.

2. DESCRIPTION OF RELATED ART

At present, the mainstream train operation control systems in China are China Train Control System (CTCS) for high-speed rails and Communication Based Train Control (CBTC) system for urban rail transit, both of which are mature systems. In the CTCS system, the calculation of driving permission is provided completely by a ground device. In a CTCS-3 system, mobile authorization is calculated by a Radio Block Center (RBC), which provides line data and mobile authorization information to a vehicle-mounted device, and the vehicle-mounted device calculates stop points through the mobile authorization provided by the RBC. In the CBTC system, driving permission is provided to a vehicle-mounted device by a Zone Controller (ZC), and the vehicle-mounted device calculates stop points. Through the analysis, it can be seen that the mobile authorization of the existing systems is provided by the ground, so as to ensure the safety of train operation. The sending source of mobile authorization of the existing systems is simple, just one device or one system. Once the system fails, the mobile authorization provided by the ground is wrong, and the vehicle-mounted device of a train cannot recognize the error, accidents may happen. At present, a train operation control system featuring vehicle-to-vehicle communication has been developed in urban rail transit, in which a vehicle-mounted device calculates driving permission according to the line data, line status and the position information of a train in front provided by the ground. However, the existing vehicle-to-vehicle communication system also only uses a vehicle-mounted device to calculate mobile calculation, and information is not verified.

With the mature application of railway technology and the improvement of train running speed and efficiency in the future, how to ensure the operation safety and efficiency of railways, especially high-speed railways, has become a technical problem to be solved.

BRIEF SUMMARY OF THE INVENTION

In order to overcome the defects in the prior art, the invention provides a train control method based on mobile authorization verification.

The purpose of the invention can be realized by the following technical scheme.

According to one aspect of the invention, a train control method based on mobile authorization verification is provided, which compares driving permission sent by a vehicle-mounted device to a ground trackside device with driving permission calculated by itself, and outputs the strictest driving permission.

As a preferred technical scheme, the method adds a vehicle-to-vehicle communication function on the basis of a CTCS-3 train control system, adds a function of calculating mobile authorization by the vehicle-mounted device on the basis of confirming the use of trackside resources by the vehicle-mounted device, and compares the same with mobile authorization calculated by the ground trackside device.

As a preferred technical scheme, on the basis of a vehicle-to-vehicle communication train control system, the ground trackside device is added to calculate mobile authorization and send the same to the vehicle-mounted device, and the vehicle-mounted device compares mobile authorization calculated by itself with the mobile authorization sent by the ground trackside device.

As a preferred technical scheme, the vehicle-mounted device calculates mobile authorization and stop points according to the line data, trackside resource allocation and locking situation, and the position information of a train in front; a resource management unit (RMU) in the ground trackside device calculates mobile authorization according to the line data, trackside resource allocation and locking situation, and the position information of trains in front and behind, and sends the same to the vehicle-mounted device; and the vehicle-mounted device compares the mobile authorization information sent by the RMU with the mobile authorization information calculated by itself, and the stricter one of the two pieces of mobile authorization information is selected to calculate stop points.

As a preferred technical scheme, the comparison of the mobile authorization information follows the principles below:

(1) if an end point of the mobile authorization calculated by the vehicle-mounted device is greater than an authorized end point calculated by the RMU, the vehicle-mounted device will reduce an end point of driving permission to the authorized end point calculated by the RMU;

(2) if an end point of the mobile authorization calculated by the vehicle-mounted device is less than an authorized end point calculated by the RMU, the vehicle-mounted device will calculate an authorized end point according to the mobile authorization calculated by itself;

(3) if communication between the vehicle-mounted device and the RMU is normal in the case of a communication failure between front and back trains, the vehicle-mounted device will calculate the mobile authorization according to resource allocation obtained from the RMU and compare the same with the mobile authorization sent by the RMU; and (4) if the vehicle-mounted device cannot obtain the usage situation of ground resources in the case of a vehicle-to-ground communication failure, vehicle control is conducted in a degraded mode of CTCS-2 or driving is conducted in a mode of manual OnSight driving.

As a preferred technical scheme, the trackside resources comprise fixed resources and movable resources;

the fixed resources comprise section track zones and tracks, and the fixed resources can be used by trains after being allocated; and the movable resources comprise track zones with turnouts in a throat area of a station, and the movable resources can be used only when the track zones have been allocated and the turnouts are locked by the current train.

As a preferred technical scheme, the vehicle-mounted device and the RMU have line data with consistent results; the vehicle-mounted device applies to the RMU for resource occupation and locking of the movable resources, and obtains the resource allocation and movable resource locking situation from the RMU; and the vehicle-mounted device sends an application for resource sharing to the train in front through vehicle-to-vehicle communication and obtains the position of the train in front and the resource sharing status from the train in front, and the RMU obtains corresponding position information and resource sharing information from the trains in front and behind respectively according to vehicle-to-ground communication.

As a preferred technical scheme, the vehicle-mounted device calculates the mobile authorization, starting from the position of the train itself, and searching a corresponding zone forward to determine the end point of the mobile authorization;

for resources occupied by other trains, whether the resources are movable resources and whether the resources have been locked by the current train are used to determine the end point of the mobile authorization as the tail of the train in front or the beginning of the current zone; and for unoccupied resources, whether the resources have been allocated to the current train is checked if the resources are fixed resources, whether the resources have been allocated to the current train and locked by the current train is checked if the resources are movable resources, the current zone is added as part of the mobile authorization and searching is continued if the conditions are met, and otherwise, searching is terminated.

As a preferred technical scheme, when calculating the mobile authorization, the RMU calculates the mobile authorization of all trains within the RMU, and can obtain the resource situation of the current train from an adjacent RMU.

As a preferred technical scheme, when communication between the trains in front and behind in the system is interrupted or there is a non-communication vehicle, the process of calculating and comparing the mobile authorization by the vehicle-mounted device of a train with normal vehicle-to-ground communication and the RMU is normally conducted.

Compared with the prior art, the invention has the following advantages.

(1) The invention calculates the strictest driving permission by comparing the driving permission calculated by the vehicle-mounted device itself with the driving permission sent by the RMU, and takes the safest value after 2-out-of-2 comparison, which is equivalent to 2-out-of-2 under different devices and different algorithms, thus improving the safety of the system.

(2) The invention can realize mutual verification of the driving permission calculated by the vehicle-mounted device itself and the driving permission sent by the RMU, so as to prevent single-point data errors or program errors to a certain extent, prevent human errors of data and systematic errors of devices, and improve the correctness and safety of driving permission calculation.

(3) Adding mobile authorization calculation on the vehicle or on the ground causes little change to the information flow of the system and the basic structure of the system, and is an easy and effective method for improving the safety of the system. For a CTCS-3 system, without adding vehicle-to-vehicle communication, the function of mobile authorization comparison between the vehicle-mounted device and the ground device can still be realized.

(4) When communication between the trains in front and behind in the system is interrupted or there is a non-communication vehicle, the mechanism of calculating and comparing the mobile authorization by the vehicle-mounted device of a train with normal vehicle-to-ground communication and the RMU is still established, and the system has strong usability.

DETAILED DESCRIPTION OF THE INVENTION

Figure 1:
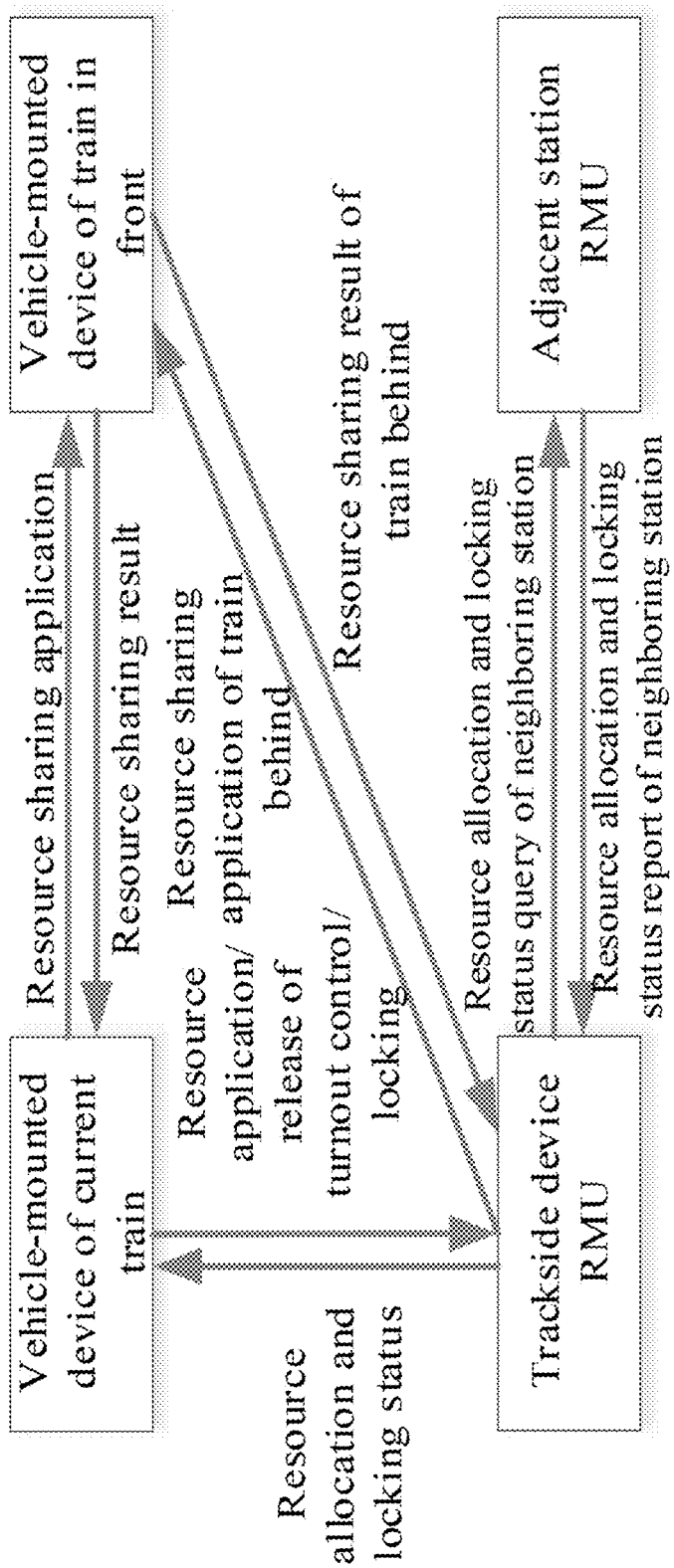
FIG. 1 is an information flow diagram of a vehicle-mounted device and a trackside RMU device of the invention.

Hereinafter, the technical scheme in the embodiments of the invention will be described clearly and completely with reference to the drawings in the embodiments of the invention. Obviously, the described embodiments are only part of the embodiments of the invention, not all of the embodiments. Based on the embodiments of the invention, all other embodiments obtained by those of ordinary skill in the art without creative labor are within the scope of the invention.

The invention relates to a train operation control system based on vehicle-to-vehicle communication, in which a vehicle-mounted device compares driving permission sent by a trackside device with driving permission calculated by the vehicle-mounted device itself, and then outputs the strictest driving permission, so as to ensure the safety of high-speed trains.

The method of the invention adds a vehicle-to-vehicle communication function on the basis of an existing C3 system, adds a function of calculating mobile authorization by a vehicle-mounted device on the basis of confirming the use of trackside resources by the vehicle-mounted device, and compares the same with mobile authorization calculated by a ground device; or the method of the invention adds a ground device to calculate mobile authorization and sends the same to a vehicle-mounted device on the basis of a vehicle-to-vehicle communication train control system, and the vehicle-mounted device compares mobile authorization calculated by itself with the mobile authorization sent by the ground device. In this way, the stopping position of a train can be calculated according to the strictest mobile authorization, thus improving the safety of train tracking operation. According to the invention, a trackside device for calculating mobile authorization is called RMU (resource management unit), and the RMU is an original RBC in an upgraded CTCS-3 system.

The implementation of the invention is base on the following safety criteria.

The vehicle-mounted device calculates mobile authorization and stop points according to the line data, trackside resource allocation and locking situation, and the position information of a train in front; the RMU calculates mobile authorization according to the line data, trackside resource allocation and locking situation, and the position information of trains in front and behind, and sends the same to the vehicle-mounted device; and the vehicle-mounted device compares the mobile authorization information sent by the RMU with the mobile authorization information calculated by itself, and the stricter one of the two pieces of mobile authorization information is selected to calculate stop points. The comparison of the mobile authorization information should follow the principles below:

(1) if an end point of the mobile authorization calculated by the vehicle-mounted device is greater than an authorized end point calculated by the RMU, the vehicle-mounted device will reduce an end point of driving permission to the authorized end point calculated by the RMU;

(2) if an end point of the mobile authorization calculated by the vehicle-mounted device is less than an authorized end point calculated by the RMU, the vehicle-mounted device will calculate an authorized end point according to the mobile authorization calculated by itself;

(3) if communication between the vehicle-mounted device and the RMU is normal in the case of a communication failure between front and back trains, the vehicle-mounted device will calculate the mobile authorization according to resource allocation obtained from the RMU (no resource sharing at this point) and compare the same with the mobile authorization sent by the RMU; for a CTCS-3 system, without adding vehicle-to-vehicle communication, the function of mobile authorization comparison can still be realized; and (4) if the vehicle-mounted device cannot obtain the usage situation of ground resources in the case of a vehicle-to-ground communication failure, vehicle control is conducted in a degraded mode of CTCS-2 or driving is conducted in a mode of manual OnSight driving.

The key of the invention is the introduction and use of the concept of resources. Resources can be defined as devices that can be used by a train beside a track, which are generally managed by track zones (single track zone or virtual track zone), and may include section track zones, tracks, and track zones with turnouts in a throat area of a station, etc. Resources can be divided into fixed resources and movable resources. The fixed resources, such as section track zones and tracks, can be used by trains after being allocated. The movable resources, such as track zones with turnouts in a throat area of a station, can be used only when the track zones have been allocated and the turnouts are locked by the current train.

The RMU and the vehicle-mounted device must have line data with consistent results; the vehicle-mounted device applies to the RMU for resource occupation and locking of the movable resources, and obtains the resource allocation and movable resource locking situation from the RMU; and the vehicle-mounted device sends an application for resource sharing to the train in front through vehicle-to-vehicle communication and obtains the position of the train in front and the resource sharing status from the train in front, and the RMU obtains corresponding position information and resource sharing information from the trains in front and behind respectively according to vehicle-to-ground communication. In this way, the vehicle-mounted device and the RMU can calculate the mobile authorization of the current train separately, and then the mobile authorization is compared. See attached FIG. 1 for the corresponding information flow.

Figure 2:
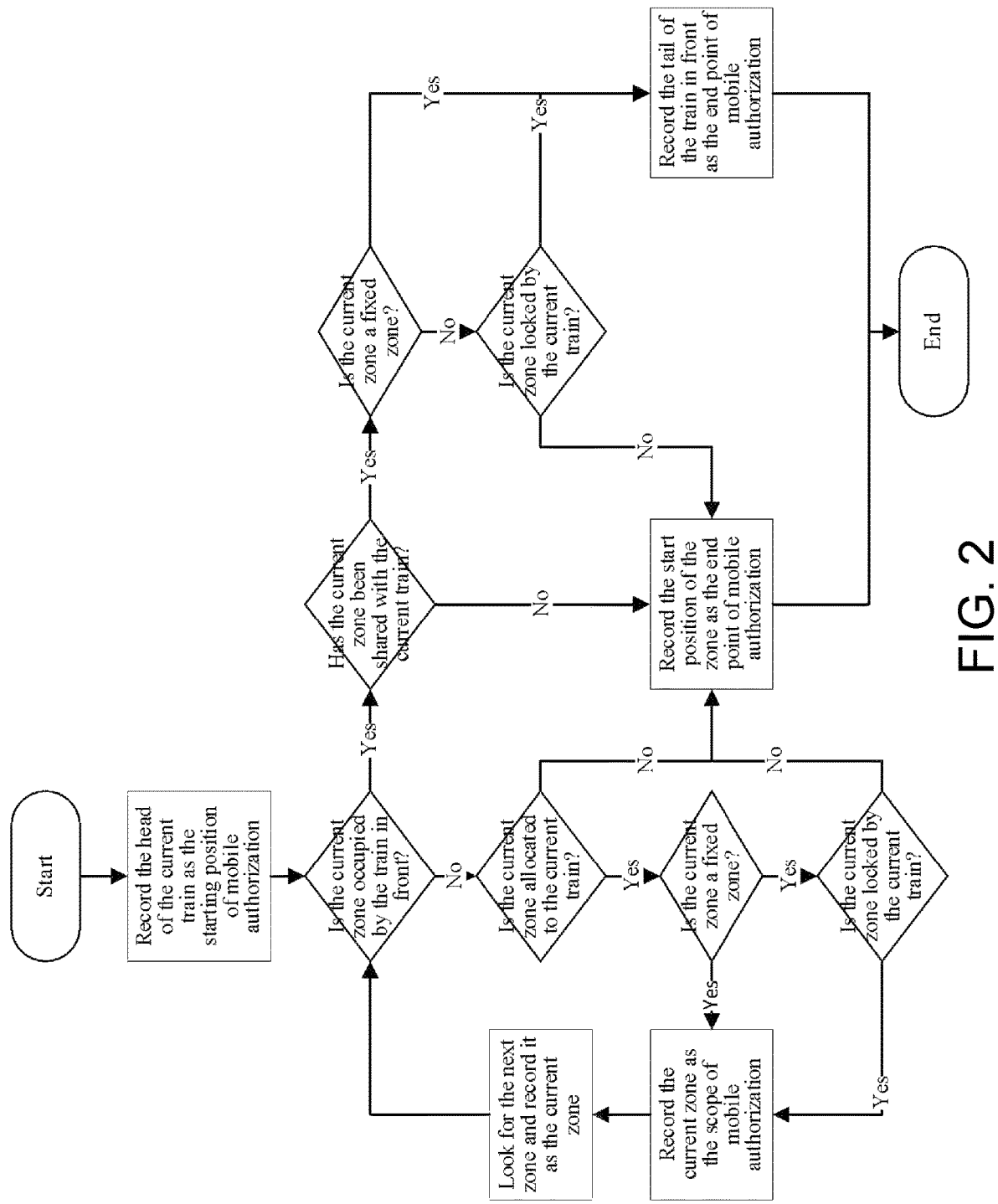
FIG. 2 is a flowchart of mobile authorization calculation by a vehicle-mounted device and an RMU according to the invention.

The vehicle-mounted device calculates the mobile authorization, starting from the position of the train itself, and searching a corresponding zone forward to determine the end point of the mobile authorization; for resources occupied by other trains, whether the resources are movable resources and whether the resources have been locked by the current train (mobile authorization of which is calculated) are used to determine the end point of the mobile authorization as the tail of the train in front or the beginning of the current zone; and for unoccupied resources, whether the resources have been allocated to the current train is checked if the resources are fixed resources, whether the resources have been allocated to the current train and locked by the current train is checked if the resources are movable resources, the current zone is added as part of the mobile authorization and searching is continued if the conditions are met, and otherwise, searching is terminated. See FIG. 2 for details.

The RMU calculates the mobile authorization in a similar way as the vehicle-mounted vehicle. The difference is that when calculating the mobile authorization, the RMU calculates the mobile authorization of all trains within the RMU, and can obtain the resource situation of the current train from an adjacent RMU.

When communication between the trains in front and behind in the system is interrupted or there is a non-communication vehicle (vehicle-mounted device failure, communication failure or other reasons), the mechanism of calculating and comparing the mobile authorization by the vehicle-mounted device of a train with normal vehicle-to-ground communication and the RMU is still established.

By means of mobile authorization comparison of the invention, the vehicle-mounted device can have two sources for comparison, so that the correctness of mobile authorization calculation is improved, and the safety of train stop points is ensured. If wireless communication between vehicles is interrupted, the vehicle-mounted device cannot obtain the position information of a train in front, but the vehicle-mounted device can receive the resource allocation information sent by the RMU, so as to ensure that the train keeps running in the current mode without stopping, thus improving the usability of the device and reducing the impact of system degradation on operation.

Figure 3:
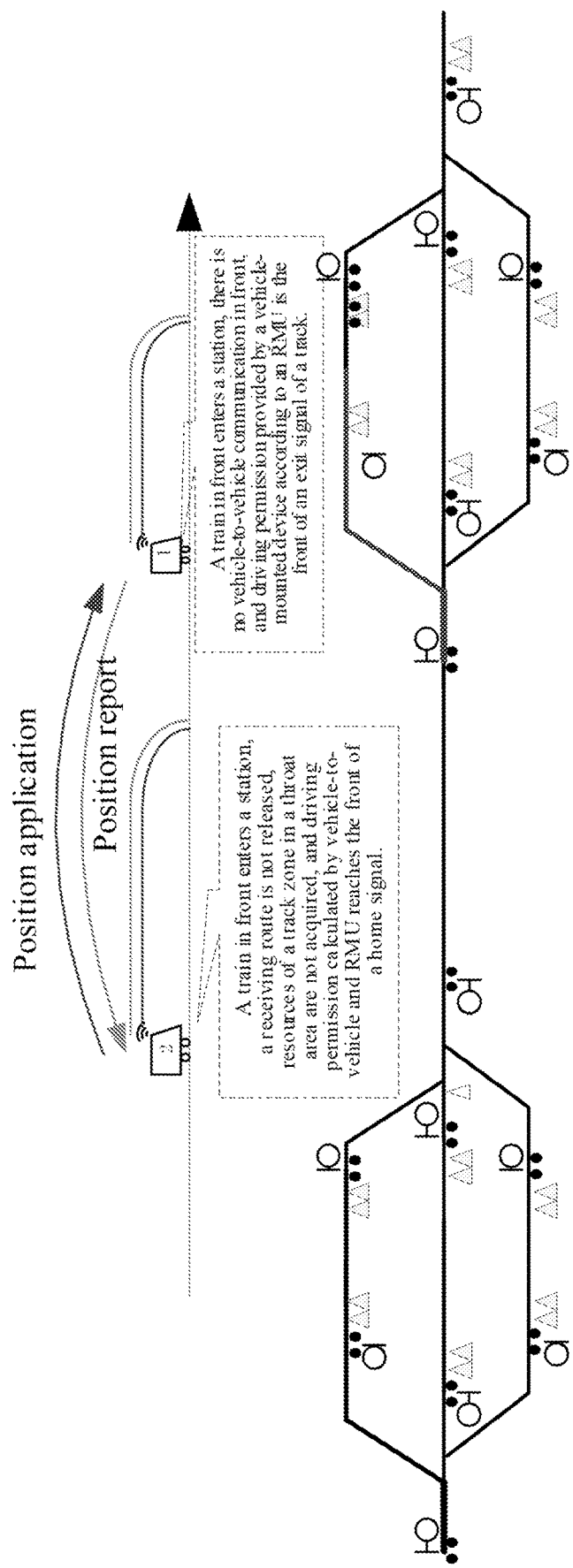
FIG. 3 is a schematic diagram of a specific embodiment of the invention, after a train in front enters a station and before a receiving route is opened.

Specific Embodiments (1) After a train in front enters a station and before a receiving route of a train behind is established, the end point of mobile authorization of the train behind is a home signal, as shown in FIG. 3.

Figure 4:
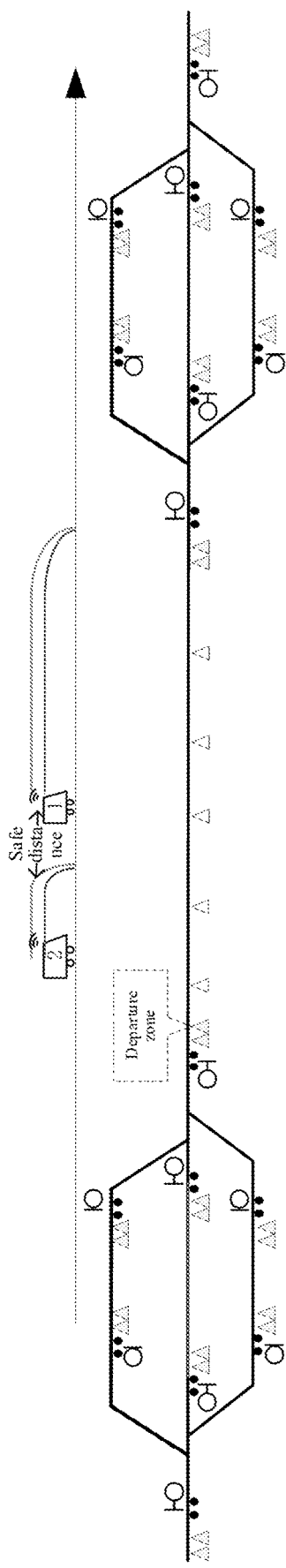
FIG. 4 is a schematic diagram of section tracking in a specific embodiment of the invention.

(2) A train in front and a train behind are in tracking movement in a section, and the end point of mobile authorization of the train behind is the tail of the train in front minus a safety protection distance, as shown in FIG. 4.

A normal train 1 and a train 2 are in tracking movement in a section, and the driving permission end point of the train 2 is the tail of the normal train 1 minus the safety protection distance, so as to realize block tracking of the two trains in the section. During operation, the driving permission extends forward with the operation of the train in front. After the train 1 enters a station, resources are released, and the driving permission of the train 2 extends to the home signal with the opening of a route.

The above are only specific embodiments of the invention, but the protection scope of the invention is not limited thereto. Any person familiar with the technical field can easily think of various equivalent modifications or substitutions within the technical scope disclosed by the invention, and these modifications or substitutions should fall within the protection scope of the invention. Therefore, the protection scope of the invention shall be subject to the protection scope of the claims.

What is claimed is:

1. A train control method based on mobile authorization verification, the method comprising:
   calculating, by a vehicle-mounted device, a first mobile authorization according to line data, trackside resource allocation and locking situation, and position information of a train in front;
   calculating, by a resource management unit (RMU) in a ground trackside device, a second mobile authorization according to the line data, the trackside resource allocation and locking situation, and the position information of trains in front and behind, and sending the second mobile authorization to the vehicle-mounted device; and
   comparing, by the vehicle-mounted device, the first mobile authorization with the second mobile authorization, and selecting a stricter one of the first and second mobile authorizations to control train operation;
   wherein the trackside resources comprise fixed resources and movable resources, wherein the fixed resources comprise section track zones and tracks and can be used by trains after being allocated, and wherein the movable resources comprise track zones with turnouts and can be used only when allocated and locked by the current train; and
   wherein calculating the first mobile authorization comprises searching forward from a position of the vehicle-mounted device's own train to determine an end point of the mobile authorization based on whether resources are occupied by other trains, and for unoccupied resources, based on whether the resources have been allocated to the current train and, if the resources are movable resources, locked by the current train.

2. The train control method based on mobile authorization verification according to claim 1, wherein the comparison of the mobile authorization information follows the principles below:
   (1) if an end point of the mobile authorization calculated by the vehicle-mounted device is greater than an authorized end point calculated by the RMU, the vehicle-mounted device will reduce an end point of driving permission to the authorized end point calculated by the RMU;
   (2) if an end point of the mobile authorization calculated by the vehicle-mounted device is less than an authorized end point calculated by the RMU, the vehicle-mounted device will calculate an authorized end point according to the mobile authorization calculated by the vehicle-mounted device;
   (3) if communication between the vehicle-mounted device and the RMU is normal in the case of a communication failure between front and back trains, the vehicle-mounted device will calculate the mobile authorization according to resource allocation obtained from the RMU and compare the same with the mobile authorization sent by the RMU; and
   (4) if the vehicle-mounted device cannot obtain the usage situation of ground resources in the case of a vehicle-to-ground communication failure, vehicle control is conducted in a degraded mode of CTCS-2 or driving is conducted in a mode of manual OnSight driving.

3. The train control method based on mobile authorization verification according to claim 1, wherein the vehicle-mounted device and the RMU have line data with consistent results; the vehicle-mounted device applies to the RMU for resource occupation and locking of the movable resources, and obtains the resource allocation and movable resource locking situation from the RMU; and the vehicle-mounted device sends an application for resource sharing to the train in front through vehicle-to-vehicle communication and obtains the position of the train in front and the resource sharing status from the train in front, and the RMU obtains corresponding position information and resource sharing information from the trains in front and behind respectively according to vehicle-to-ground communication.

4. The train control method based on mobile authorization verification according to claim 1, wherein when calculating the mobile authorization, the RMU calculates the mobile authorization of all trains within the RMU, and can obtain the resource situation of the current train from an adjacent RMU.

5. The train control method based on mobile authorization verification according to claim 1, wherein when communication between the trains in front and behind in the system is interrupted or there is a non-communication vehicle, the process of calculating and comparing the mobile authorization by the vehicle-mounted device of a train with normal vehicle-to-ground communication and the RMU is normally conducted.

* * * * *